United States Patent
Herrmann et al.

(10) Patent No.: US 7,047,946 B2
(45) Date of Patent: May 23, 2006

(54) METHOD FOR OPERATING AN INTERNAL COMBUSTION ENGINE

(75) Inventors: Lothar Herrmann, Schwabisch Hall (DE); Oliver Steil, Maikammer (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/032,319

(22) Filed: Jan. 10, 2005

(65) Prior Publication Data

US 2005/0224041 A1 Oct. 13, 2005

Related U.S. Application Data

(63) Continuation-in-part of application No. PCT/EP03/006992, filed on Jul. 1, 2003.

(30) Foreign Application Priority Data

Jul. 11, 2002 (DE) ................................ 102 31 582

(51) Int. Cl.
*F02M 37/04* (2006.01)
(52) U.S. Cl. ........................ 123/500; 123/496
(58) Field of Classification Search ................ 123/500, 123/501, 503, 504, 299, 300, 295, 467, 306; 239/533.2
See application file for complete search history.

(56) References Cited

U.S. PATENT DOCUMENTS

| | | | | |
|---|---|---|---|---|
| 4,545,352 A * | 10/1985 | Jourde et al. | ................ | 123/447 |
| 4,825,828 A * | 5/1989 | Schlunke et al. | ........... | 123/276 |
| 5,345,916 A * | 9/1994 | Amann et al. | ............... | 123/506 |
| 5,524,825 A * | 6/1996 | Ueda | ........................... | 239/88 |
| 5,967,413 A * | 10/1999 | Tian | ............................ | 239/88 |
| 6,085,726 A * | 7/2000 | Lei et al. | ..................... | 123/446 |
| 6,253,736 B1 * | 7/2001 | Crofts et al. | ................. | 123/498 |
| 6,499,467 B1 * | 12/2002 | Morris et al. | ............... | 123/467 |
| 6,575,139 B1 * | 6/2003 | Rodriguez-Amaya et al. | ........... | 123/467 |
| 6,604,507 B1 * | 8/2003 | Lei et al. | ..................... | 123/446 |
| 6,837,221 B1 * | 1/2005 | Crofts et al. | ................. | 123/467 |
| 2003/0085308 A1 * | 5/2003 | Parrish | .................... | 239/585.1 |

FOREIGN PATENT DOCUMENTS

| | | |
|---|---|---|
| DE | 196 42 653 | 1/1998 |
| DE | 196 36 088 | 3/1998 |
| DE | 197 52 851 | 12/1998 |
| DE | 100 40 117 | 2/2000 |
| DE | 198 57 785 | 6/2000 |
| DE | 100 12 970 | 9/2001 |
| DE | 100 42 570 | 3/2002 |
| EP | 0 829 641 | 3/1998 |
| EP | 0 971 119 | 1/2000 |
| EP | 1 260 701 | 11/2002 |
| WO | WO 01/63118 | 8/2001 |

\* cited by examiner

*Primary Examiner*—Mahmoud Gimie
(74) *Attorney, Agent, or Firm*—Klaus J. Bach

(57) ABSTRACT

In a method for forming a fuel/air mixture in a direct-injection internal combustion engine with a fuel injection nozzle arranged in each cylinder, a closing member of the fuel injection nozzle is moved from a closed position to an operating position by means of a control device at different speeds until the operating stroke is reached, in order to obtain optimum combustion, and a uniform concentration of the fuel particles introduced with increased impulse into the combustion chamber is achieved providing for the formation of a swirl with a constant symmetry and uniform distribution of fuel in the swirl.

11 Claims, 2 Drawing Sheets

METHOD FOR OPERATING AN INTERNAL COMBUSTION ENGINE

This is a Continuation-In-Part Application of international application PCT/EP03/006992 filed Jul. 1, 2003 and claiming the priority of German application 102 31 582.5 filed Jul. 11, 2002

BACKGROUND OF THE INVENTION

The invention relates to a method for operating an internal combustion engine with direct fuel injection, in particular a spark-ignited internal combustion engine with direct fuel injection.

In the operation of new internal combustion engines with direct fuel injection, improvements in the mixture formation by the configuration of the fuel injection profile are obtained both for self-igniting and for spark-ignited internal combustion engines. It is attempted to influence the combustion and the emission formation by varying the shape of the fuel injection profile.

DE 198 57 785 C2 discloses a method for the formation of a fuel mixture in a combustion chamber of an internal combustion engine, in which the fuel is injected in three stages, in which a main quantity of fuel is joined with an ignition quantity of fuel via an additional quantity of fuel without the injection being interrupted. With the additional quantity of fuel, which is injected between the main quantity injection of fuel and the igniting quantity injection of fuel, the times of the beginning and end of the injections of the main quantity of fuel and of the additional igniting quantity of fuel can be selected in a flexible manner.

DE 100 40 117 A1 discloses a method for operating a diesel engine, in which it is attempted, by particularly rapidly opening an injector valve, to achieve good homogenization of the fuel/air mixture. In this method, a sharp injection profile is obtained by the sudden opening of the injector valve in order to improve the homogenization of the fuel/air mixture.

Furthermore, DE 100 12 970 A1 discloses a method for forming an ignitable fuel/air mixture, in which the fuel is introduced in at least two partial quantities into the combustion space of the internal combustion engine, wherein the body of an injection nozzle can be brought into its closed position after a partial quantity of fuel is injected. The fuel beam is accelerated in the nozzle up to the outlet by the fact that the nozzle opening continuously narrows toward the outlet with a curved or parabola-shaped discharging passage.

DE 19636088 discloses a method for controlling the direct injection of fuel into the combustion space of an internal combustion engine, with which different fuel flow control cross-sections are obtained by means of a stroke-dependent, actuator, so that, in the case of temporally consecutive valve positions between the beginning and the end of the injection process, the fuel flow control cross-section of a control valve always remains above a minimum value which is different from the closed position.

The publication DE 19642653 C1 discloses a method for the mixture formation of an internal combustion engine with direct fuel injection, with which, during the injection of fuel, an opening stroke of a valve element relative to a valve seat of an injector and the injection time can be variably adjusted, for thus dynamically influencing the injection angle and also the mass flow of fuel.

Since as a result of manufacturing tolerances different fuel jets are generated, which often lead to spark failures because of different mixture formations the particular geometry of the injection nozzles would have to be corrected before they are installed in an internal combustion engine, which is practically impossible.

It is therefore the object of the invention to provide an injection nozzle whereby an optimum injection behavior and consequently an improved combustion can be obtained despite manufacturing tolerances.

SUMMARY OF THE INVENTION

In a method for forming a fuel/air mixture in a direct-injection internal combustion engine with a fuel injection nozzle arranged in each cylinder, a closing member of the fuel injection nozzle is moved from a closed position to an operating position by means of a control device at different speeds until the operating stroke is reached, in order to obtain optimum combustion, and a uniform concentration of the fuel particles introduced with increased impulse into the combustion chamber is achieved providing for the formation of a swirl with a constant symmetry and uniform distribution of fuel in the swirl.

The method according to the invention is distinguished by the formation of an ignitable fuel/air mixture in a combustion chamber of a direct-injection internal combustion engine, having an injection nozzle which has a closing member, in which an operating stroke and a fuel injection time can be variably adjusted.

The injection nozzle is designed such the fuel droplets receive an increased impulse as they emerge from the injection nozzle, and the disintegration of the fuel droplets after the fuel has emerged from the outlet opening of the injection nozzle is increased. The closing member of the injection nozzle is preferably brought from one to another operating position in a period of less than 200 µsec with the closed state also constituting an operating position.

In one refinement of the invention, the closing member is opened in such a way that the closing member is moved at a high and constant speed as far as the operating position with a speed remaining below the level of a maximum obtainable speed. The sudden opening and the rapid setting of the operating position of the closing body mean that the fuel flows out of the injection nozzle into the combustion space with a relatively high impetus, as a result of which an increased atomization of the fuel droplets is obtained. This enables manufacturing tolerances to be compensated for, i.e. the manufacturing errors which occur occasionally have hardly any effect on the behavior of the fuel leaving the injection nozzle.

In a further refinement of the invention, the opening of the injection nozzle is designed in such a manner that, when the closing member starts to move to an operating position, it is first moved at a reduced speed and then the speed is continuously increased up to a maximum value until the operating position is reached. This likewise increases the atomization properties, as a result of which the properties of the engine combustion, are improved and in particular consumption and emission are reduced. Furthermore, the symmetry in the spray pattern generated for the injected fuel is improved and, furthermore, manufacturing-induced variations in the spray pattern are compensated for.

In a further refinement of the invention, the opening of the injection nozzle is designed in such a manner that the closing member of the injection nozzle, as it approaches an operating position, is initially moved at a reduced speed whereupon the speed is increased up to a maximum value, and then the closing body is again slowed down shortly before it reaches the operating position.

According to a further refinement of the invention, the injection nozzle is opened in such a manner that the closing member of the injection nozzle is moved at an increased constant speed as far as an intermediate position, which corresponds to a stroke which is greater than the operating stroke. When the intermediate position is reached, the member body is then moved back to the operating position immediately or after a certain rest period. As an alternative, the closing member can be moved as far as the intermediate position in accordance with a previous refinement of the invention, in which case the closing member can generally be moved in accordance with a combination of above movement steps.

According to a further refinement of the invention, the injection nozzle is opened in such a manner that the closing member of the injection nozzle is moved at an increased and constant speed as far as an operating position $H_A$. When the position $H_A$ is reached, the closing member is moved after a certain rest period $T_{AH}$-$T_A$ at an increased and constant speed to an operating position B, which corresponds to a stroke which is greater than the stroke of the operating position $T_A$. When the position $T_B$ is reached, the closing body is moved immediately, or after a certain rest period $T_{BH}$-$T_B$ at an increased and constant speed into the closed position.

The method according to the invention is suitable, in particular, for use in direct-injection spark-ignition engines, in which a well prepared mixture has to be present in the region of the spark plug within a very short time. The method according to the invention however is also suitable for self-igniting internal combustion engines. Since the manufacturing-induced deviations in the injection spray pattern are compensated for, the spray pattern is positively influenced. A uniform distribution of the fuel is thus obtained in all of the regions of the injected fuel spray. This leads to a required symmetry for an injected fuel spray in all of the operating cycles, thus minimizing or eliminating undesired tilting phenomena of the spray pattern.

The method according to the invention is used particularly in the case of outwardly opening injection nozzles, in which the fuel is injected as a hollow cone. Injection nozzles of this type are preferably used in connection with spark-ignited internal combustion engines in which there is a spray-guided combustion process. In internal combustion engines of this type, the fuel is injected in such a manner that a toroidal swirl is formed at the end of the hollow fuel cone, with the electrodes of a spark plug, which is arranged in the combustion space, being disposed outside the hollow fuel injection cone but within a fuel/air mixture formed in the form of the toroidal swirl. By means of the method according to the invention, a necessary symmetry of the toroidal swirl is maintained and a tilting of the toroidal swirl obtained is prevented. This improves the ignition of the fuel/air mixture and prevents the occurrence of spark failures.

Further features and combinations of features will become apparent from the description. Specific exemplary embodiments of the invention are illustrated in simplified form in the drawings and are explained in greater detail in the following description on the basis of the accompanying drawings.

DESCRIPTION OF PREFERRED EMBODIMENTS

Figure 1:
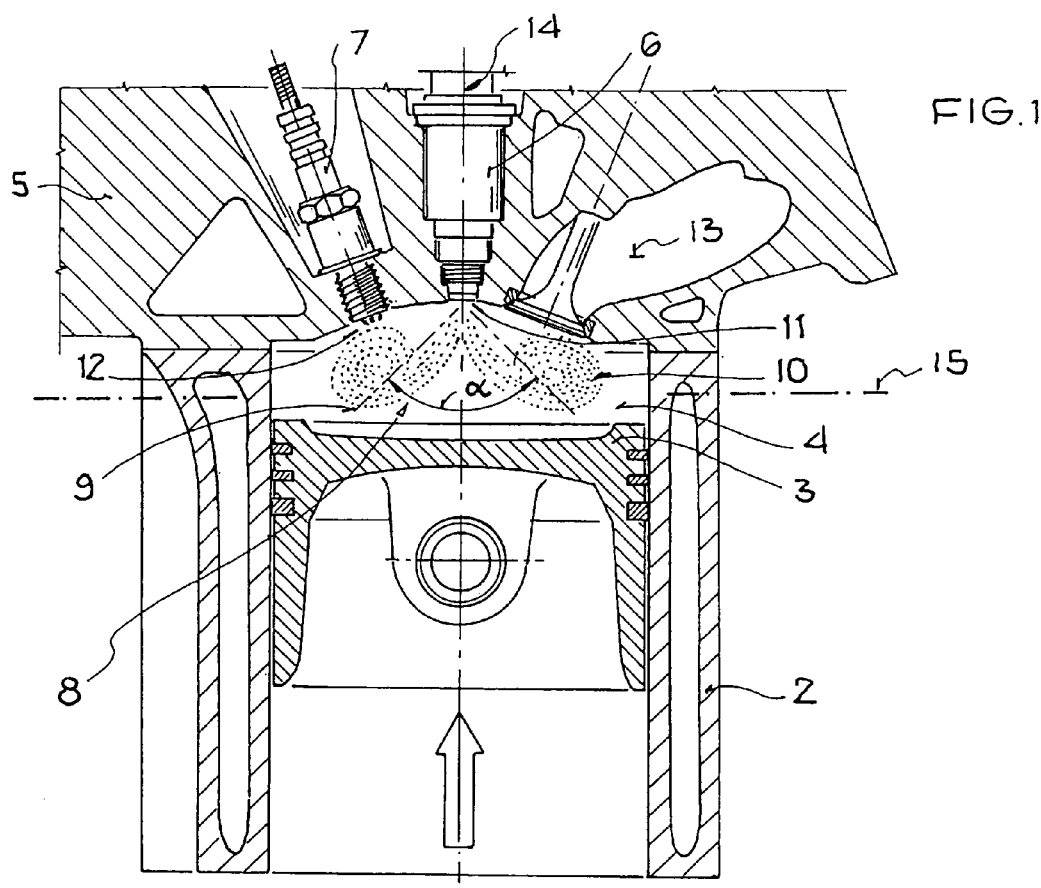
FIG. 1 is a sectional illustration of a cylinder of a direct-injection, spark-ignited internal combustion engine.

FIG. 1 shows a cylinder 2 of a spark-ignited internal combustion engine 1 with direct fuel injection, in which a combustion space 4 is delimited between a piston 3 and a cylinder head 5. The piston 3 is longitudinally displaceable in the cylinder 2, the longitudinal mobility of the piston 3 being delimited by an upper dead-center position and a lower dead-center position. The internal combustion engine 1 which is illustrated in FIG. 1 operates in accordance with the four-cycle principle, the method according to the invention being just as readily suitable for spark-ignited as for self-igniting two-cycle internal combustion engines with direct fuel injection. In the first cycle, combustion air is fed to the combustion chamber 4 through an inlet passage 13, while the piston 3 moves in a downward movement toward the lower dead-center position. In the following compression cycle, the piston 3 moves upwardly movement from the lower dead-center position to the upper dead-center position, with the fuel being injected during the compression cycle in a stratified charge operation of the internal combustion engine 1. In the region of the upper dead-center position, the fuel/air mixture is ignited by means of a spark plug 7, and the piston 3 moves downwardly toward the lower dead-center position. In the last cycle, the piston 3 moves again upwardly toward the upper dead-center position and pushes the exhaust gases out of the combustion chamber 4.

The internal combustion engine 1 according to the present exemplary embodiment is operated in the lower and central rotational speed- and load ranges in the stratified charge operation and, in the upper load range, is operated in the homogeneous charge mode of operation. In particular during the stratified charge operation there is a "spray-guided" combustion process. During stratified charge operation, the fuel is injected during the compression stroke preferably in a crankshaft angle range of between 40 and 10° before the upper dead center position. In this case, the fuel is injected into the combustion chamber 4 preferably in two partial quantities.

In a spray-guided combustion process of this type preferably an injector 6 with outwardly opening injection nozzle 11 is used with which a hollow fuel cone 8 is produced, preferably with an angle α of between 70° and 100°. Since the hollow fuel cone 8 strikes combustion air that is compressed in the combustion chamber 4, a toroidal swirl 10 is formed in the combustion chamber 4 in such a manner that an ignitable fuel/air mixture is obtained in the region of the electrodes 12 of the spark plug 7. The spark plug 7 is arranged in such a manner that the electrodes 12 of the spark plug 7 situated outside the circumferential surface 9 of the fuel cone 8 project into the swirl 10. As a result, the electrodes 12 of the spark plug 7 are not wetted with fuel. In order to obtain an optimum combustion of the injected fuel, a symmetrical and uniform, toroidal swirl 10 has to be formed, i.e. the toroidal swirl 10 which is obtained is intended to have a uniform distribution of fuel over the entire region, so that tilting of the swirl does not occur, and furthermore, the need for a defined rotational position of the fuel injection valve 6 in the cylinder head 5 can be avoided when the fuel injection valve 6 is installed.

Figure 2:
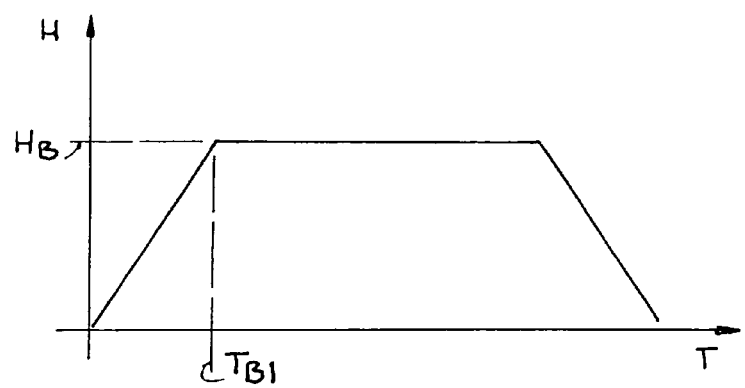
FIG. 2 shows a schematic diagram with a stroke profile of a closing member of a fuel injection nozzle of the internal combustion engine of FIG. 1, plotted over time.

FIG. 2 shows a schematic stroke profile of the closing member of the fuel injection nozzle 11 according to FIG. 1 over time T. The fuel is injected in such a manner that the opening period $T_{B1}$ of the closing member of the injection nozzle 11 up to an operating stroke $H_B$ is completed over a period of time of approximately 100 μsec to 200 μsec. The rapid opening of the closing member at a high and constant speed causes the fuel to be accelerated out of the injection nozzle 11 in such a manner that the fuel droplets have a relatively high impulse when they enter the combustion chamber 4, as a result of which better atomization and more rapid mixing with the combustion air already present in the combustion chamber are obtained. The rapid opening avoids a nonuniform distribution of fuel in the fuel cone 8, caused by manufacturing tolerances. It is the aim to obtain a symmetrical swirl 10 with a uniform distribution of fuel without undesired tilting, i.e. a horizontal line 15 through the swirl 10 formed is to be situated as far as possible in a plane extending perpendicularly to the fuel valve axis 14 during the entire period of operation of the internal combustion engine 1. Also to be avoided is the formation of strands at the end of the fuel cone 8 or of the swirl 10.

Figure 3:
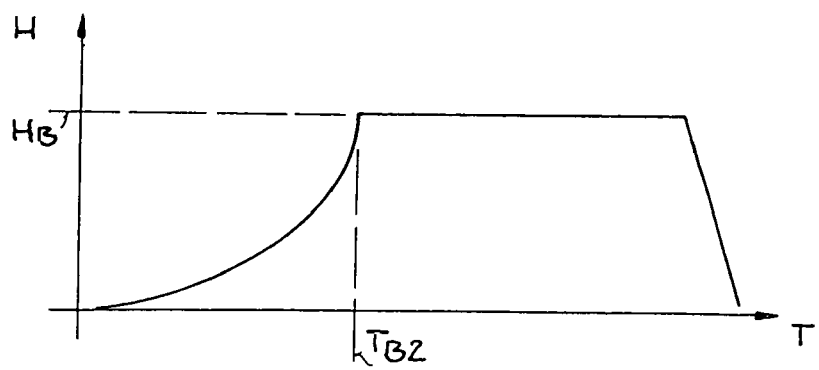
FIG. 3 shows a schematic diagram with a stroke profile of a closing member of a fuel injection nozzle of the internal combustion engine from FIG. 1, plotted over time, according to a second exemplary method of the invention.

In FIG. 3, a second exemplary method is illustrated, in which the closing member of the injection nozzle 11 is opened in such a manner that it is first moved at a relatively low speed, but is accelerated up to a maximum valve opening value stroke $H_B$. During the slow opening of the closing body, first little fuel flows into the combustion chamber 4 and is slowed down by the combustion-space counter pressure present, and is then entrained by the fuel that shoots out into the combustion space 4 with a relatively high impulse because of the later, more rapid opening, thus obtaining an improved atomization and uniform distribution of the fuel in the cone 8. This avoids the swirl 10 being of asymmetrical design and strands from being formed in the lower region of the swirl. Because of the uniform distribution of the fuel over the entire region of the toroidal swirl 10, the fuel particles are transported into the outer region of the swirl 10 toward the electrodes 12 of the spark plug 7 and are concentrated there. In the process, the fuel particles which have already been atomized are mixed with the combustion air and form an ignitable fuel/air mixture.

Figure 4:
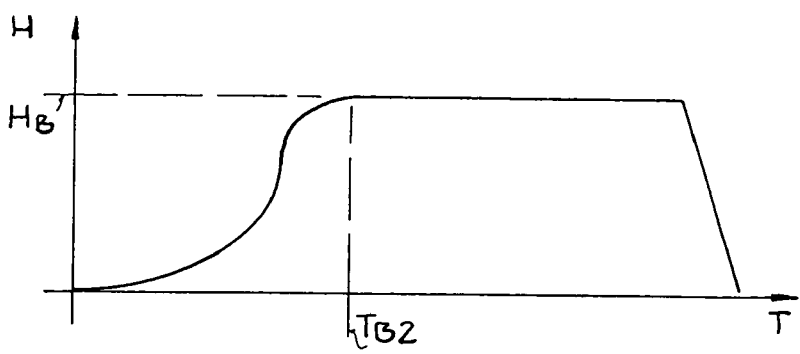
FIG. 4 shows a schematic diagram with a stroke profile of a closing member of a fuel injection nozzle of the internal combustion engine from FIG. 1, plotted over time, according to a third uncoupling method of the invention.

According to FIG. 4, a further exemplary embodiment of the invention is illustrated, in which first the closing member of the injection nozzle 11 is opened slowly and, after a short time, continues to be opened at an increasing speed, the speed of the closing member decreasing shortly before the operating stroke $H_B$ is reached. In a similar manner as in the previous exemplary embodiment, the fuel particles are introduced into the combustion space 4 with a relatively high impulse and are distributed uniformly in the toroidal eddy 10.

Figure 5:
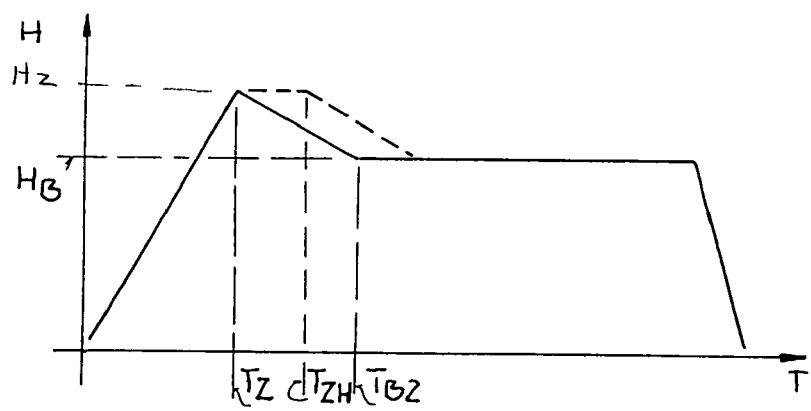
FIG. 5 shows a schematic diagram with a stroke profile of a closing member of a fuel injection nozzle of the internal combustion engine from FIG. 1, plotted over time, according to a fourth exemplary method of the invention.

According to FIG. 5, a further exemplary embodiment is illustrated, in which the closing member is brought at a high speed within a time $T_Z$ to an intermediate stroke position $H_Z$, the intermediate stroke position Hz being greater than the normal operating stroke $H_B$. When the intermediate stroke position $H_Z$ is reached, the closing member is moved back to the operating stroke within the period $T_{B2}-T_Z$ immediately or after a certain rest period $T_{ZH}-T_Z$. During this course of opening, the fuel particles from the injection nozzle are accelerated in such a manner that they are injected into the combustion chamber with a very high impulse. As a result, better atomization is obtained and manufacturing tolerances are therefore compensated for. According to this exemplary embodiment, a higher speed is obtained during the opening of the injection nozzle, thus increasing the disintegration of the fuel.

Figure 6:
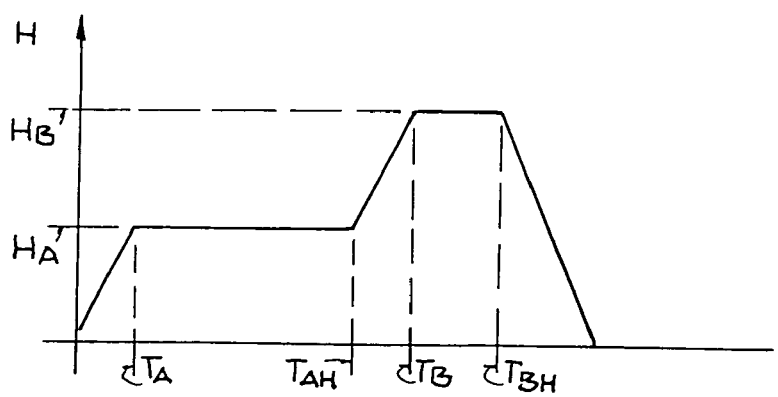

According to FIG. 6, a further exemplary embodiment is illustrated, in which the closing member is brought at a high speed within a time $T_A$ to a stroke position $H_A$. When the stroke position $H_A$ is reached, the closing body is moved, after a certain rest period $T_{AH}-T_A$, at an increased and constant speed in a time $T_B-T_{AH}$ to an operating position B, which corresponds to a stroke $H_B$ which is greater than the stroke of the operating position A. If the position B is reached, the closing body is moved at an increased and constant speed into the closed position immediately or after a certain rest period $T_{BH}$. During opening, first small drops are generated which lead to an early formation of a toroidal swirl. The large stroke of the operating position B produces drops with a great impulse which enlarge and stabilize the toroidal swirl.

The method examples illustrated permit optimum combustion and provide a distinctive, toroidal formation of swirls. In this case, the fuel particles are concentrated in the border region of the swirl 10. This results in a greater area of contact with the combustion air. Furthermore, the formation of an swirl 10 with a constant symmetry and a regular, uniform distribution of fuel is obtained. Furthermore, the installation of fuel valves is facilitated, since a defined rotational position of the fuel valve 6 is not required. A further advantage is that manufacturing inaccuracies in the production of fuel valves compensated as inaccuracies generally have a negative effect on the mixture formation in the case of the direct-injection internal combustion engines.

In all of the method examples illustrated, the fuel is preferably injected into the combustion chamber during stratified charge engine operation with a combustion-chamber counter pressure of approx. 16 bar, which corresponds to an instant in which the crankshaft angle is approximately 30° before the top dead center position OT. This injection of fuel is undertaken in the stratified charge operation; during the homogeneous operation of the internal combustion engine 1, the fuel is injected during the intake cycle of the internal combustion engine. In the method examples illustrated above, the change in the operating position of the closing member of the injection nozzle 11 should be obtained in less than 200 μsec.

It is furthermore advantageous that the injection pressure of the injection nozzle 11 is varied between 100 bar and 300 bar or between 150 bar and 250 bar, the fuel spray 8 emerging from the injection nozzle 11 being formed conically with a spray angle α of between 70° and 100°.

The invention relates to a method for forming a fuel/air mixture of a direct-injection internal combustion engine, with which a closing member of the fuel injection nozzle is moved from a closed position to an operating position by means of a control device in such a manner that different speeds are provided during the operating stroke, in order to provide for optimum combustion, and, in the case of a toroidal formation of swirls, to permit a uniform concentration of the fuel particles introduced with increased impulse into the combustion space in the border region of the swirl, so that the swirl is formed with a constant symmetry and uniform distribution of fuel.

What is claimed is:

1. A method for forming an ignitable fuel/air mixture in a combustion chamber of a direct-injection internal combustion engine, having a fuel injector with an injection nozzle including an outwardly opening conical closing member for controlling the flow of fuel injected into the combustion chamber in the form of a hollow cone, said method comprising the steps of moving the closing member of the fuel injection nozzle from a closed position to an operating position in a controlled manner, wherein the operating stroke of the closing member and the fuel injection duration is variably adjusted in that, during a fuel injection process, the closing member is moved between the closed position and the operating position with a variably controlled acceleration at variably controlled speeds until the predetermined operating stroke is reached, whereby the impulse of the fuel droplets in the hollow cone is increased upon discharge from the injection nozzle and the disintegration of the fuel droplets upon leaving the injection nozzle is enhanced.

2. The method as claimed in claim 1, wherein the closing member of the fuel injection nozzle is initially moved from the closed position to the operating position at a slow speed and then at a continuously increasing speed up to a maximum value when the operating position is reached.

3. The method as claimed in claim 1, wherein the closing member is initially moved from a closed position to an operating position at a slow speed and then at an increasing speed up to a maximum value, the speed being reduced to less than the maximum speed before the operating position is reached.

4. The method as claimed in claim 1, wherein the closing member is moved from the closed position to the operating position at a high and constant speed until a stroke which is greater than the operating stroke is reached, and is then moved back to the operating position at a high and constant speed.

5. The method as claimed in claim 1, wherein the closing member is moved from the closed position to the operating position at a high and constant speed until a stroke is reached below the operating position and, after a resting period, the closing body is moved at a high and constant speed to an operating position with a higher stroke.

6. The method as claimed in claim 1, wherein a toroidal fuel/air mixture swirl is formed at the end of the injected hollow fuel cone in such a manner that electrodes of a spark plug, which is arranged outside a circumferential surface of the injected hollow fuel cone, extend into the toroidal and ignitable fuel/air mixture swirl.

7. The method as claimed in claim 1, wherein the fuel injector including the fuel injection nozzle is operated piezoelectrically.

8. The method as claimed in claim 1, wherein, in a homogeneous charge operation of the internal combustion engine, the fuel is injected into the combustion chamber during at least one of the intake stroke and the compression stroke.

9. The method as claimed in claim 1, wherein in the stratified charge operating mode of the internal combustion engine the fuel is injected during the compression stroke.

10. The method as claimed in claim 1, wherein the fuel is injected in a single total quantity.

11. The method as claimed in claim 1, wherein the fuel is injected in at least two partial quantities.

* * * * *